United States Patent [19]

Otani et al.

[11] Patent Number: 4,732,959

[45] Date of Patent: * Mar. 22, 1988

[54] POLYESTERPOLYOL DERIVATIVE AND A POLY(URETHANE)UREAMIDE OBTAINED THEREFROM

[75] Inventors: Kozo Otani, Amagasaki; Yoshio Yamada, Takatsuki, both of Japan

[73] Assignee: Toyo Tire & Rubber Company Limited, Osaka, Japan

[*] Notice: The portion of the term of this patent subsequent to Aug. 27, 2002 has been disclaimed.

[21] Appl. No.: 797,665

[22] Filed: Nov. 13, 1985

[30] Foreign Application Priority Data

Nov. 22, 1984 [JP] Japan ................... 59-247176
Nov. 22, 1984 [JP] Japan ................... 247177

[51] Int. Cl.⁴ .............. C08G 18/00; C08G 18/32; C08F 283/00
[52] U.S. Cl. .................. 528/68; 521/163; 525/418; 528/288; 528/331
[58] Field of Search ............ 528/68; 521/163; 525/418

[56] References Cited

U.S. PATENT DOCUMENTS

| | | | |
|---|---|---|---|
| 4,328,322 | 5/1982 | Baron | 521/163 |
| 4,463,157 | 7/1984 | Kersten et al. | 528/68 |
| 4,537,945 | 8/1985 | Otani et al. | 528/68 |

*Primary Examiner*—Harold D. Anderson
*Assistant Examiner*—Dennis R. Daley
*Attorney, Agent, or Firm*—Murray and Whisenhunt

[57] ABSTRACT

A polymer comprising a poly(urethane)ureamide is prepared by a reaction of a polyisocyanate and a polyesterpolyol derivative of the formula [I]

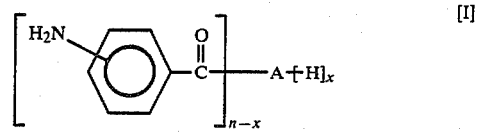

wherein
A is an n-valaent radical obtained by removal of terminal hydrogen atoms from an n-valaent polyester-polyol having a molecular weight of 400 to 10,000 and containing

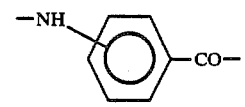

group in the main chain,
n is an integer of $2 \leq n \leq 4$,
x is an average value and a number of $0 \leq x \leq (n-1)$,
—NH— group of

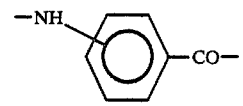

in the main chain forms an amido group connected with a carbonyl group of an aminobenzoic acid and/or a carbonyl group of a polybasic acid component of the polyesterpolyol and,
—CO— group of

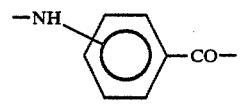

in the main chain forms an ester group or amido group. The polymer has higher heat resistance and greater mechanical strength as compared to corresponding polyester-urethanes.

8 Claims, No Drawings

POLYESTERPOLYOL DERIVATIVE AND A POLY(URETHANE)UREAMIDE OBTAINED THEREFROM

The invention relates to a polyesterpolyol derivative having at least one terminal amino group, and a polymer comprising a poly(urethane)ureamide which is obtained by a polyaddition reaction of the above polyesterpolyol derivative and a polyisocyanate.

In Japanese Patent Application Nos. 199,384/1982, 165,447/1982, 75,182/1983, 66,599/1984 and 124,019/1984 filed previously by us are shown in polyetherpolyol derivative having an amino group at the end of molecule and its process, a polymer obtained by the reaction of the abobe polyetherpolyol derivative and a polyisocyanate and its process. In these applications, the starting polyols are not polyesterpolyols but are all polyetherpolyols.

A polyesterpolyol derivative having amino and optionally hydroxyl groups in the ends of the molecule and further aromatic amido groups in the main chain is reacted with a polyisocyanate to produce a poly(urethane)ureamide containaing urea bonds and aromatic amido groups. This poly(urethane)ureamide has many excellent advantages compared with a polyurethane obtained from a polyesterpolyol and a polyisocyanate.

Particularly, the poly(urethane)ureamide of the invention which is prepared by a polyaddition reaction of the polyesterpolyol derivative having amino and optionally hydroxyl groups in the ends of the molecule and further having aromatic amido groups in the main chain and a polyisocyanate has a higher heat resistance and a greater mechanical strength compared with a corresponding polyurethane.

U.S. Pat. No. 4,328,322 discloses a polymer which is prepared by a polyaddition reaction of a para-aminobenzoate of a polyol with a polyisocyanate, the para-aminobenzoate of the polyol being prepared by a reaction of a polyol with para-nitrobenzoyl chloride and a reduction of nitro groups to amino groups, and all of the terminal hydroxyl groups of the polyol are replaced by amino-containing groups. Further, in the same U.S. Patent is described a polymer which is prepared by a polyaddition reaction of a para-aminobenzoic amide of a polyamine with a polyisocyanate, the para-aminobenzoic amide of the polyamine being prepared by the reaction of a polyamine with para-nitrobenzoyl chloride or para-nitrobenzoic acid and the reduction of nitro groups to amino groups to replace all of the terminal amino groups of the polyamine by amino-containing groups.

The poly(urethane)ureamide of the invention is obtained by a polyaddition reaction of a polyesterpolyol derivative and a polyisocyanate, the polyesterpolyol derivative having terminal aromatic amino groups in a partial or whole ends of the molecule and having aromatic amido groups in the main chain (i.e. in the formula (I) on page 4, when x=0, the polyesterpolyol derivative has aromatic amino groups at all ends of the molecule and, when x is not 0, the polyesterpolyol derivative only has aromatic amino groups at a portion of the ends of the molecule). Thus, the present polymer differs in chemical structure from the polymer disclosed in the above U.S. Pat. No. 4,328,322.

An object of the invention is to provide a polyesterpolyol derivative and a process thereof, the derivative having amino and optionally hydroxyl groups in the ends of the molecule and further having aromatic amido groups in the main chain of the molecule.

Another object of the invention is to provide a polymer and a process thereof, the polymer comprising a poly(urethane)ureamide which is obtained by a polyaddition reaction of the above polyesterpolyol derivative and a polyisocyanate.

The above and other objects of the invention will become apparent from the following description.

The present invention provides a polyesterpolyol dertivative and a process for preparing the same, the polyesterpolyol derivative being represented by the formula [I]

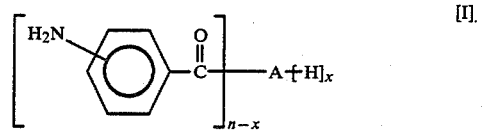

wherein
A is an n-valaent radical obtained by removal of terminal hydrogen atoms from an n-valaent polyesterpolyol having a molecular weight of 400 to 10,000 and containing

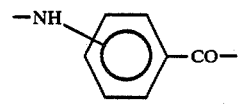

group in the main chain,
n is an integer of $2 \leq n \leq 4$,
x is an average value and a number of $0 \leq x \leq (n-1)$,
—NH— group of

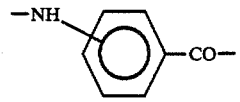

in the main chain forms an amido group connected with a carbonyl group of an aminobenzoic acid and/or a carbonyl group of a polybasic acid component of the polyesterpolyol and,
—CO— group of

in the main chain forms an ester group or amido group.

The present invention also provides a polymer comprising a poly(urethane)ureamide obtained by a polyaddition reaction of a polyisocyanate and the above polyesterpolyol derivative of the formula [I].

Further, the present invention provides a polymer and a process for preparing the same, the polymer comprising a poly(urethane)ureamide obtained by a reaction of the polyesterpolyol derivative of the formula [I], a chain extender and a polyisocyanate.

The polyesterpolyol derivative of the invention represented by the formula [I] has aromatic amino groups in a part or all of the ends of the molecule and has aromatic amido groups in the main chain of the molecule. The polyesterpolyol derivative can be prepared by substantially a single-stage process in a high yield without purification.

The polyesterpolyol derivative of the invention can be prepared by reacting a 2- to 4-valent polyesterpolyol having a molecular weight of 400 to 10,000 with an aminobenzoic acid alkyl ester.

The polyesterpolyol used in the invention can be any one of known condensed-type polyesterpolyol, those obtained from a polymerization of a lactone (hereinafter referred to as "lactone-type polyesterpolyol"), etc. The condensed-type polyesterpolyol is obtained by a condensation reaction of an acid component and a polyol component, the acid component being adipic acid, sebacic acid, terephthalic acid, isophthalic acid, maleic acid, fumaric acid and like saturated or unsaturated dibasic acids, maleic anhydride, phthalic anhydride and like acid anhydrides, dimethyl terephthalate and like dialkyl esters, etc., and the polyol component being ethylene glycol, propylene glycol, butylene glycol, diethylene glycol, dipropylene glycol, neopentyl glycol, 1,6-hexylene glycol and like glycols. Examples thereof are polyethylene adipate polyol, polybutylene adipate polyol, polyhexylene adipate polyol and like adipate polyols which are prepared from a kind of acid and a kind of glycol, polyethylenebutylene adipate polyol, polyethylenediethylene adipate polyol, polyhexyleneopentylene adipate polyol and like adipate polyols which are prepared from a kind of acid and plural kinds of glycol, polyethylene adipate terephthalate polyol, polyethylene adipate isophthalate polyol and like aromatic polyols which are prepared from plural kinds of acid and a kind of glycol, etc.

The lactone-type polyesterpolyol can be prepared by a ring-opening polymerization of ε-caprolactone, γ-butyrolactone and like lactones, which has a variety of composition depending on kinds of an initiator. Examples of preferable initiators are ethylene glycol, butylene glycol and like glycols, polyoxypropylene glycol (PPG), polyoxytetramethylene glycol (PTMG) and like polyetherpolyols, adipate polyol and like condensed-type polyesterpolyol, etc.

In the invention, condensed-type polyesterpolyol and lactone-type polyesterpolyol having at least 2 functionality are preferably used. Examples thereof are condensed-type polyesterpolyols prepared with use of glycerin or trimethylolpropane as a part of glycol component, or those prepared by use of trimellitic acid and like polybasic acid as a part of dibasic acid. Examples of lactone-type polyesterpolyols are those obtained with use of glycerin, trimethylolpropane, pentaerythritol, etc. as an initiator of the ring-opening polymerization.

Among the above polyesterpolyols, preferable are 2- to 3-valent polyesterpolyol having a molecular weight of 1,000 to 4,000 when the resulting polyesterpolyol derivative is used as a starting material for an elastomer. Polyesterpolyol having 3 to 4 valency and a molecular weight of 400 to 1,500, for example, lactone-type polyesterpolyol prepared with use of pentaerythritol as an initiator, is preferable, in case the resulting polyesterpolyol derivative is used as a starting material for a plastics.

Aminobenzoic acid alkyl esters used in the invention may be any of ortho, meta or para-aminobenzoic acid alkyl ester. Para-aminobenzoic acid alkyl ester is particularly preferable when the polyesterpolyol derivative of the invention is used as a starting material for an elastomer or plastics.

Various kinds of alkyl groups are exemplified in the aminobenzoic acid alkyl ester. Preferred examples thereof are methyl, ethyl, propyl, butyl, hexyl, octyl, cyclobutyl, cyclopentyl, cycloheptyl and like linear or cyclic alkyl groups having 1 to 8 carbon atoms. 2-Butoxyethyl and 2-ethoxyethyl are also preferable.

Further, bis(aminobenzoic acid)alkyl esters are also used. Bis(aminobenzoic acid)esters of ethylene glycol, propylene glycol, butylene glycol, hexylene glycol, heptylene glycol and like glycols having 2 to 8 carbon atoms are preferably used.

In the invention, it is preferable to react one mole of the above n-valent polyesterpolyol with 0.25 n to 10 n moles, preferably 0.5 to 2 n moles of aminobenzoic acid alkyl ester.

The polyesterpolyol derivative of the invention can be obtained by the reaction conducted with or without use of a known esterification catalyst. The reaction proceeds usually at 150° to 250° C., preferably in a stream of an inert gas such as nitrogen with removal of alcohol. Weak acid or weak basic catalyst is preferable which affects least the ester bonds in the polyesterpolyol and hardly causes side reactions such as a dehydration reaction of hydroxyl group. Examples of useful catalysts are antimony trioxide, lead monoxide and like metal oxide, tetra-isopropyl titanate, tetrabutyl titanate and like organic titanium compounds, calcium acetate and like alkaline earth metal salt of weak acids, among these most preferable being organic titanium compounds. The amount of catalyst is usually up to 1000 ppm. An inert solvent and antioxidant such as triphenyl phosphate may be usable in the reaction. The reaction is continued until the distillation of alcohol is completed. The polyesterpolyol derivative is obtained without purification by removing from the reaction mixture the remaining alcohol and, if present, excess of aminobenzoic acid alkyl ester.

It should be noted, in the reaction of the polyesterpolyol and aminobenzoic acid alkyl ester, that the ester group in the polyesterpolyol reacts with both of a terminal OH group of the polyesterpolyol and NH₂ group of the ester. Namely, these ester interchange reaction and amide formation reaction proceed simultaneously.

The above two kinds of reactions can be controlled by varying the reaction temperature, mole ratio of the polyesterpolyol and aminobenzoic acid alkyl ester, time requiring for removing alcohol, etc.

Accordingly, the polyesterpolyol derivative of the invention which is obtained from the polyesterpolyol and aminobenzoic acid alkyl ester, has a molecular weight different from that calculated from the molecular weight of the starting polyesterpolyol and the amount of the starting aminobenzoic acid alkyl ester. Thus, care should be paid to the amounts of the starting materials in order to obtain a polyesterpolyol derivative having a desired molecular weight. The content of amido group is an important factor to prepare a contemplated polymer of the invention having high heat-resistance and mechanical strength.

Mechanism of formation of the aromatic amido group is not sufficiently clarified but is presumed as follows.

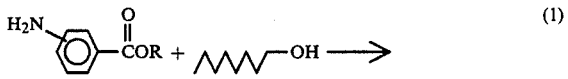

(1)

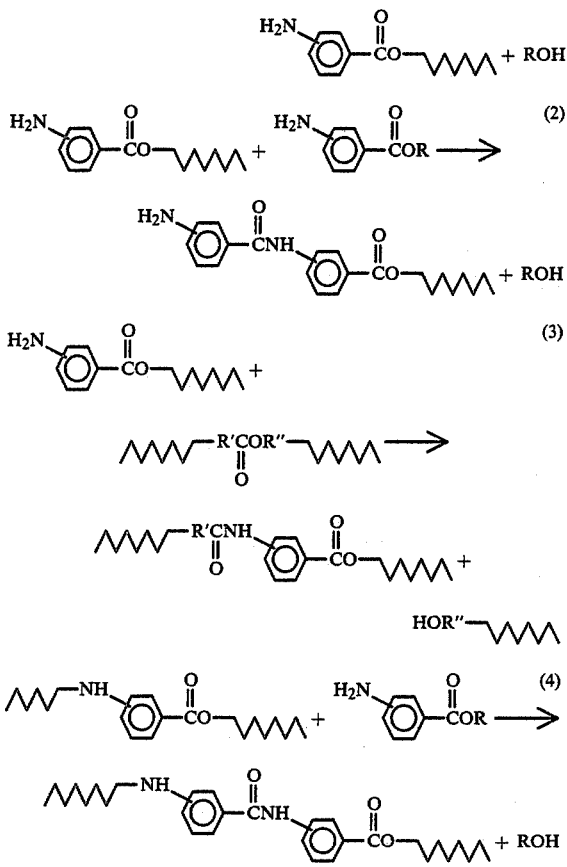

Equation (1) shows an amination of a terminal group of the polyesterpolyol, equation (2) a formation of an aromatic amido group which is adjacent to a terminal aminophenyl group, equation (3) an insertion of an aromatic amido group in the main chain of the polyester an equation (4) an insertion of further aromatic amido group in the main chain of the polyester which already contains the aromatic amido group.

A content of the aromatic amido group in the polyesterpolyol derivative can be determined quantitatively by NMR analysis and nitrogen elementary analysis.

In case an aliphatic polyesterpolyol was used as a starting material, the polyesterpolyol derivative of the invention has amido groups predominantly in the main chain than in the adjacent positions of the terminals by the $^{13}$C-NMR analysis. From the above, it can be presumed that the amide formation occurs more frequently in the main chain, because of a great difference in numbers of the two kinds of esters, namely between ester groups in the main chain and those in the terminals of the aminobenzoic acid esters. Accordingly, it is considered that the amide formation occurs predominently in the main chain.

The polyesterpolyol derivative obtained by the process of the invention may be either an ester in which all of the terminal hydroxyl groups are converted to amino-containing groups or a partial ester having unreacted hydroxyl groups. The polyesterpolyol derivative has aromatic amido groups in the main chain. The amination degree (namely esterification degree in the terminal hydroxyl groups) and amidation degree may be in a wide range depending on the use. It is essential that at least, on average, one hydroxyl group of the polyesterpolyol is subjected to esterification and the amination degree is preferably about 50 to 100%. A content of amido groups varies in the range of about 5 to 2000 mole% but is preferably about 5 to 100 mole% based on the terminal amio groups. With the above range of the amido groups, the polyesterpolyol derivative has an adequate viscosity and the resulting polymer has an excellent amenability to molding.

In the invention, an example of the polyesterpolyol derivative of the formula [I] is shown by the following formula, when polyethylene adipate polyol is used as a starting polyesterpolyol. In the formula, each segment does not indicate the order of recurring units but shows proportions of the units. In the main chain, —NHC$_6$H$_4$CO— groups do not exist in a block state but in a random state, and are present with or without being connected to the terminal aminobenzoyl group.

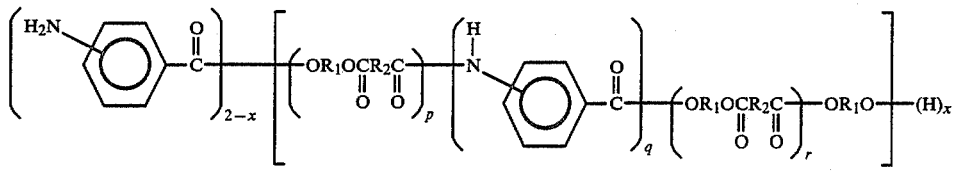

$R_1$: $CH_2CH_2$ $R_2$: $CH_2CH_2CH_2CH_2$ x: a value indicating an average valency and a number of $0 \leq x \leq 1$ p,r: an average value indicating a number of the recurring units and a number of $0 \leq p, r \leq m$ q: an average value indicating a number of the units contained in one molecule and a number of $0.05 \leq q \leq 10$, which does not show recurring number m: a positive number determined by molecular weight and $p + r = m$ Further, the following formula is an example of the polyesterpolyol derivative of the formula [I], in which a diol obtained by a ring-opening polymerization of ε-caprolactone is used as a starting material.

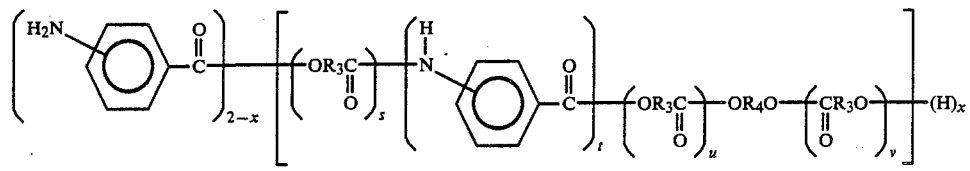

R$_3$: CH$_2$CH$_2$CH$_2$CH$_2$CH$_2$

R$_4$: CH$_2$CH$_2$, CH$_2$CH$_2$CH$_2$CH$_2$ or like alkylene group x: a value indicating an average valency and a number of $0 \leq x \leq 1$ s,u,v: an average value indicating a number of the recurring units and a number of $0 \leq s, u, v \leq m$ t: an average value indicating a number of the units contained in one molecule and a number of $0.05 \leq t \leq 10$, which does not show recurring number m: a positive number determined by molecular weight and $s + u + v = m$ The above two examples merely illustrate the polyesterpolyol derivative when a difunctional polyesterpolyol is used as a starting material and are not intended to restrict the polyesterpolyol derivative of the invention.

Any of the polyisocyanates known in polyurethane chemistry is usable as a polyisocyanate of the invention. Example of useful polyisocyanates include hexamethylene diisocyanate, isophorone diisocyanate, 4,4'-dicyclohexylmethane diisocyanate, 2,4-tolylene diisocyanate(2,4-TDI), 2,6-tolylene diisocyanate(2,6-TDI), 4,4'-diphenylmethane diisocyanate(MDI), carbodiimide-modified MDI, polymethylenepolyphenyl isocyanate(-PAPI), ortho-toluidine diisocyanate(TODI), naphthylene diisocyanate(NDI), xylylene diisocyanate(XDI), etc. These polyisocyanates are useful singly or in admixture of at least two of them.

The poly(urethane)ureamide of the invention can be prepared by any of processes known in polyurethane chemistry, by a polyaddition reaction of a polyisocyanate and the polyesterpolyol derivative having amino and optionally hydroxyl groups in the ends of the molecule and further having aromatic amido groups in the main chain. For example, the polyaddition reaction may be conducted in the presence of an active hydrogen-containing compound which is capable of reacting with isocyanate group. Further, any of known additives in polyurethane chemistry may be added such as a catalyst, fire retardant, plasticizer, filler, blowing agent, antioxidant, pigment, inert organic solvent, etc.

In case of the production of an elastomer in the invention, it is preferable to conduct the reaction in the presence of a suitable chain extender. The chain extender includes a 2- to 4-valent polyol having a molecular weight of up to 400, diamine having a primary or secondary terminal amino group and a molecular weight of up to 400. Preferable chain extenders are for example:

(a) ethylene glycol, diethylene glycol, propylene glycol, dipropylene glycol, butanediol, hexanediol, glycerin, trimethylolpropane, pentaerythritol, sorbitol, 1,4-cyclohexanediol, 1,4-cyclohexanedimethanol, xylylene glycol and like polyols.

(b) hydrazine, ethylenediamine, tetramethylenediamine, hexamethylenediamine, 1,4-cyclohexanediamine, phenylenediamine, xylylenediamine, 2,4-tolylenediamine, 4,4'-diaminodiphenylmethane, 3,3'-dichloro-4,4'-diaminodiphenylmethane, 1,4-dichloro-3,5-diaminobenzene, 1,3-propanediol-di-para-aminobenzoate and like diamines (c) ethanolamine, diethanolamine, triethanolamine, and like alkanolamines (d) a polyol having a molecular weight of up to 400 and obtained by the addition of propylene oxide and/or ethylene oxide to the above polyols, diamines, alkanolamines or to hydroquinone, pyrogallol, 4,4'-isopropylidenediphenol or aniline, in any order. Among the above, preferable are diamines which especially enhance the effect of the invention.

In the invention, it is possible to use a known active hydrogen-containing compound which is capable of reacting with isocyanate group. Examples thereof are a long-chain polyol, polyamine, aminopolyol, etc. Preferred long-chain polyols have a molecular weight of more than 400 and at least one hydroxyl group. Particularly preferable long-chain polyols are polyoxyalkylenepolyols having a molecular weight of 400 to 1000 and 2 to 8 valencies, such as polyoxyethylenepolyol, polyoxypropylenepolyol, polyoxyethyleneoxypropylenepolyol, polyoxytetramethylenpolyol; polymer polyols obtained by a graft-copolymerization of the above polyoxyalkylenepolyol with styrene, acrylonitrile or the like; polyesterpolyols which are usable as a starting material for the present polyesterpolyol derivative. Further, usable are polycarbonate polyols such as polyhexamethylenecarbonate polyol, polyolefin polyols such as polybutadiene polyol containing a terminal hydroxyl group, expoxy oligomers containing an epoxy group in the end of the molecule and a hydroxyl group in the side chain, polyols obtained by a ring-opening of the epoxy oligomer with an alkanolamine or the like, etc.

Preferable long-chain polyamines have a molecular weight of more than 400 and at least one amino group. Examples thereof are polyether polyamines obtained by the reaction of ammonia or the like with a terminal hydroxyl group of polyoxyalkylenepolyol, polyether polyamines prepared by reacting ethyleneimine or the like with a known polyol, etc.

Long-chain aminopolyols have a molecular weight of more than 400 and both of amino and hydroxyl groups in the molecule. Examples thereof are aminopolyols obtained by converting a part of hydroxyl groups of a polyol into an amino group by the above-mentioned method. Further, preferably usable are polyetherpolyol derivatives having at least one terminal aminobenzoic acid ester group which are disclosed in Japanese Kokai No. 53,533/1984.

The polyaddition reaction of the polyesterpolyol derivative and the polyisocyanate is preferably conducted under an isocyanate index of 95 to 120. The reaction is conducted in a similar manner in the presence of a another active hydrogen-containing compound. The polyesterpolyol derivative is usually reacted with a molten polyisocyanate at room temperature or around a melting temperature of polyisocyanate. The reaction can be carried out at room temperature when using a polyisocyanate which is liquid at room temperature. In case of using a known long-chain active hydrogen-containing compound, chain extender and/or blowing agent, these compounds are preferably dissolved in the polyesterpolyol derivative prior to use. The reaction can be conducted by a prepolymer method. For example, a part or all of the polyesterpolyol derivative is reacted with an excess of the polyisocyanate to prepare a prepolymer having a terminal isocyanate group, and then the prepolymer is reacted with the remaining polyesterpolyol derivative and/or the chain extender. Alternatively, a part or all of known long-chain polyol is reacted with an excess of the polyisocyanate to prepare a prepolymer having a terminal isocyanate group, and then the prepolymer is reacted with the polyesterpolyol derivative and the chain extender. In these cases, the prepolymer is preferably used as heated at more than 60° to 80° C. or as dissolved in an inert solvent, in order to decrease a viscosity and improve the handling thereof.

Further, in case of preparing an elastomer by casting the present polymer, a mold is preferably heated usually at 50° to 100° C. When obtaining a cellular plastic, the reaction is conducted in the presence of a blowing agent such as water, monochlorotrifluoromethane and like low boiling compounds.

The polyesterpolyol derivative of the invention provides a poly(urethane)ureamide by a reaction with a polyisocyanate, and provides a poly(ester)amide by a reaction with a polycaboxylic acid. The polyesterpolyol derivative is also useful as a hardener of an epoxy resin.

The poly(urethane)ureamide of the invention has many advantages compared with a corresponding polyesterurethane.

1. Mechanical strength is excellent, particularly at a high temperature.

2. Adequate in reactivity

A usual polyesterpolyol reacts very slowly when a chain extender is not used. However, the present polyesterpolyol derivative has an appropriate reaction velocity.

3. Excellent in compatibility

A usual polyesterpolyol appears to react extremely fast when using an amine-type chain extender. This is caused by a precipitation of the chain extender from the reaction mixture due to a low compatiblity of the reaction mixture and a great difference in reaction velocities of the polyol and the chain extender with a polyisocyanate. In the invention, the reaction velocity is appropriate because of an excellent compatibility of the reaction mixture and a well-balanced reaction velocities.

4. Amorphous in property

The polymer obtained by the invention is amorphous and is free from a variation of hardness with a lapse of time. The variation of hardness is observed in a polymer derived from a usual polyesterpolyol due to a crystallization.

The invention will be described in detail with reference to the following Reference Examples, Examples and Comparison Examples.

EXAMPLE 1

Into a four-necked flask equipped with a stirrer, condenser, thermometer and nitrogen gas-introducing pipe was placed 2442 g (4.935 eq) of a lactone-type polyesterpolyol [Placcel-210, a product of Daicel Chemical Industry Co., Ltd., MW 990, OH value 2.02 meq/g]. The polyesterpolyol was dehydrated by heating at 100° C. for 1 hour under a stream of nitrogen gas at a reduced pressure. Thereto was added 570.5 g (3.46 moles) of ethyl p-aminobenzoate [a product of Nakalai Chemical Industry Co., Ltd., first-grade reagent] and the mixture was heated to 88° C.

To the mixture was added 1.025 g (340 ppm) of tetrabutyl titanate and the mixture was heated with stirring. The mixture became homogeneous at 110° C. and the flask wall was wetted with ethanol formed. The mixture was further heated and reacted at 225° to 230° C. for 2.5 hours to remove ethanol.

Then, the mixture was cooled to 138° C. and reduced to 7 mmHg under a stream of nitrogen gas. The mixture was again heated to 200° C. to remove unreacted ethyl p-aminobenzoate for 3 hours. A 2854 g-quantity of red brown liquid was obtained having a viscosity of 11,000 cps at 30° C.

Analysis of the liquid with gel permation chromatography showed no free ethyl p-aminobenzoate. The liquid was confirmed to be a polyesterpolyol derivative having terminal amino groups by the following method.

An amine value of the product was 0.998 meq/g by a titration with use of perchloric acid in glacial acetic acid according to Handbook of Japan Analytical Chemistry, third edition, page 261. A total amount of hydroxyl group and amino group (active hydrogen value) was 1.277 meq/g by hydroxyl value measuring method (JIS K 1557). These found values were inconsistent with an amine value (1.213 meq/g) and an active hydrogen value (1.728 meq/g) which were calculated from the amounts of the starting polyesterpolyol and ethyl p-aminobenzoate. The obtained polyesterpolyol derivative having terminal amino groups was determined to have a molecular weight of 1566 from the found active hydrogen value of 1.277 meq/g. Further, the product was confirmed by gel permeation chromatography to have a molecular weight distribution which shifted to a high molecular weight range compared with the starting polyesterpolyol. The product was also confirmed to have amido group by $^{13}$C-NMR analysis. The amido group was 20 mole% based on the terminal amino group and nitrogen content was 1.68% by elementary analysis. The content of amido group was consistent with that calculated from a difference of a total nitrogen and amine. From the above, 78.2% of the terminal hydroxyl group of the polyesterpolyol was converted to amino group and the resulting polyesterpolyol derivative contained aromatic amido group of 20 mole% based on the terminal amino group. The following is presumed to be an average chemical formula of the product.

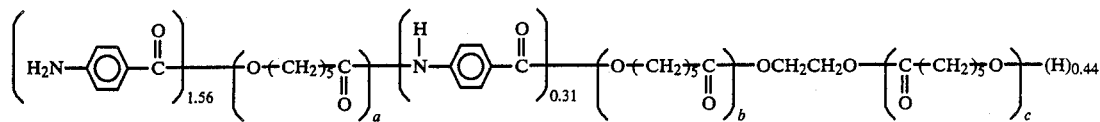

Mw 1566
a + b + c = 11.2

EXAMPLE 2

Into a four-necked flask was placed 699 g (0.718 eq) of a lactone-type polyesterpolyol [Placcel-220, a product of Daicel Chemical Industry Co., Ltd., MW 2000, OH value 1.027 meq/g]. The polyesterpolyol was dehydrated by heating at 100° C. for 1 hour under a stream of nitrogen gas at a reduced pressure. Thereto was added 86.0 g (0.521 mole) of ethyl p-aminobenzoate and the mixture was heated to 200° C.

To the mixture was added 0.195 g (248 ppm) of tetrabutyl titanate and the mixture was heated to 240° C. Ethanol began to be distilled off and the mixture was further heated at 235° to 240° C. for 8 hours to remove ethanol.

Then, the mixture was cooled to 200° C. and reduced to 5 mm Hg under a stream of nitrogen gas. The mixture was again heated to 220° C. to remove unreacted ethyl p-aminobenzoate for 6 hours. A 601 g-quantity of red brown viscous liquid was obtained having a viscosity of 7,000 cps at 60° C.

An amine value measured in the same method as in Example 1 was 0.363 meq/g, active hydrogen value was 0.599 meq/g and nitrogen content was 0.94% by elementary analysis.

From the above, 61% of the terminal hydroxyl group of the polyesterpolyol was converted to amino group and the resulting polyesterpolyol derivative contained aromatic amido group of 85 mole% based on the terminal amino group.

EXAMPLE 3

Into a four-necked flask was placed 645 g (0.640 eq) of ethylene adipate polyesterpolyol [NIppollan N-4040, a product of Nihon Polyurethane Co., Ltd., MW 2014, OH value 0.993 meq/g]. The polyesterpolyol was dehydrated by heating at 100° C. for 1 hour under a stream of nitrogen gas at a reduced pressure. Thereto was added 106 g (0.640 mole) of ethyl p-aminobenzoate and the mixture was heated to 100° C.

To the mixture was added 0.36 g (500 ppm) of tetrabutyl titanate and the mixture was heated with stirring. Ethanol began to be distilled off at about 165° C. The mixture was further heated and reacted at 200° to 215° C. for 10 hours.

Then, the mixture was cooled to 200° C. and reduced to 5 mmHg under a stream of nitrogen gas. The mixture was again heated to remove unreacted ethyl p-aminobenzoate for 6 hours. A 660 g-quantity of yellow solid was obtained having a melting point of 50° C.

An amine value measured in the same metod as in Example 1 was 0.259 meq/g and active hydrogen value was 0.461 meq/g. The product had a molecular weight of 4330 as calculated from the active hydrogen value and this was confirmed by GPC analysis. Further, unreacted ethyl p-aminobenzoate was not detected. Nitrogen content was 1.02%. From the above, 56% of the terminal hydroxyl group of the polyesterpolyol was converted to amino group and the resulting polyesterpolyol derivative contained aromatic amido group of 182 mole% based on the terminal amino group.

EXAMPLE 4

(Polyaddition product of polyesterpolyol derivative and MDI)

A 100 g-quantity of the polyesterpolyol derivative obtained in Example 1 was weighed into a 300 ml-cup made of polypropylene and heated to 50° C. Thereto added 16.76 g of 4,4'-diphenylmethane diisocyanate [pure MDI, Millionate MT, a product of Nihon Polyurethane Co., Ltd.] heated at 50° C. and the mixture was stirred for 30 seconds with a propellor agitator. The mixture was degassed in a vacuum desiccator and poured into an iron mold heated at 100° C. The mold was placed into an oven and the mixture was cured at 110° C. Tack free time was 11 minutes. The cured product was taken out from the mold and then further postcured at 110° C. for 16 hours to obtain an elastomer sheet having a thickness of 2 mm which was transparent and strong, although soft. The elastomer was aged at room temperature for 7 days and then properties thereof were measured according to JIS K 6301 (same method was employed hereinafter). The results were givn in Table 1.

COMPARISON EXAMPLE 1

In order to compare with the polymer of Example 4, a corresponding polyesterpolyol was reacted with MDI to prepare a polymer. Two kinds of polycaprolactone polyols (PCL) each having a molecular weight of about 2,000 and about 1,000 were blended to prepare a starting polyesterpolyol having an average molecular weight of 1566, which is equal molecular weight of the polyesterpolyol derivative of Example 4. Namely, 74.5 g of PCL2000 (Placcel-220, MW1959) was mixed with 25.5 g of PCL1000 (Placcel-210, MW988). A polymer was prepared in the same manner as in Example 4 with use of the above mixed polyols heated to 50° C. and a molten MDI (16.76 g) heated to 50° C. The product cured slowly and exhitibed tackiness even after 1 hour. After 2 hours, it was impossible to take out the product because it was still too soft. Then, the product as contained in the mold was cured at 110° C. for 16 hours and was taken out from the mold after cooling to obtain an elastomer sheet which was transparent and soft. The sheet, however, became opaque after 3 to 4 days and became 86 in hardness (JIS A) after 7 days. The sheet beame again transparent and soft when heated at 50° to 60° C. for 20 minutes. After placing at room temperature for 1 hour, the hardness lowered to 56. This phenomenon was considered to be caused by crystallization of the polyester component in the elastomer.

The variation of hardness due to such a crystallization was not found in the elastomer of Example 4. The sample of Comparison Example 1 was checked for properties after removing the crystal. The results were shown in Table 1.

TABLE 1

| Temp | Item | Ex. 4 | Com. Ex. 1 |
|---|---|---|---|
| 23° C. | Hardness (JIS A) | 55 | 56 |
| | 100% Tension (kg/cm$^2$) | 11 | 14 |
| | 300% Tension (kg/cm$^2$) | 13 | 14 |
| | Tensile strength (kg/cm$^2$) | 215 | 134 |
| | Elongation (%) | 750 | 700 |
| | Tear strength (B type) (kg/cm) | 19 | 17 |
| 70° C. | Tensile strength (kg/cm$^2$) | 42 | 19 |

EXAMPLE 5

(Polyaddition product of polyesterpolyol derivative and TDI)

A polymer was prepared in the same manner as in Example 4 with use of 100 g of the polyesterpolyol derivative of Example 1 heated to 50° C. and 11.67 g of 2,4-tolylene diisocyante [2,4-TDI, Coronate T-100, a product of Nihon Polyurethane Co., Ltd.] heated to 25° C. Tack free time was about 1 hour. The product was taken out from the mold after 4 hours and then futher post-cured at 110° C. for 16 hours to obtain an elastomer which was transparent and strong, although soft. Table 2 shows the results.

COMPARISON EXAMPLE 2

In order to compare with the polymer of Example 5, a corresponding polyesterpolyol was reacted with TDI to prepare a polymer. As a polyol component was used the mixed polyols of Comparison Example 1. A polymer was obtained in the same manner as in Example 4 with use of 100 g of the mixed polyols (50° C.) and 11.67 g of 2,4-TDI (25° C.). The product cured very slowly and was taken out from the mold with difficulty. Then, the product as contained in the mold was cured at 110° C. for 20 hours and was taken out from the mold after cooling. The obtained sample exhibited a marked crystallization. Namely, the sample was transparent and very soft just after the demolding but became white and hard after placed at room temperature for 1 day. The sample bacame 94 in hardness (JIS A) after 7 days. The sample became again transparent and 15 in hardness (JIS A) when heated at 50° C. for 20 minutes. This was considered to be caused by crystallization of the polyester component in the elastomer.

The variation of hardness due to such a crystallization was not seen in the elastomer of Example 5. The sample of Comparison Example 2 was checked for properties after removing the crystal. The results were shown in Table 2.

TABLE 2

| Temp | Item | Ex. 5 | Com. Ex. 2 |
|---|---|---|---|
| 23° C. | Hardness (JIS A) | 51 | 15 |
| | 100% Tension (kg/cm$^2$) | 11 | 4 |
| | 300% Tension (kg/cm$^2$) | 12 | 4 |
| | Tensile strength (kg/cm$^2$) | 154 | 29 |
| | Elongation (%) | 750 | 1400 |
| | Tear strength (B type) (kg/cm) | 19 | not measured |
| 70° C. | Tensile strength (kg/cm$^2$) | 14 | (Note 1) |

(Note 1) imposible to measure due to deformation

EXAMPLE 6

(Polyaddition product of polyesterpolyol derivative, chain extender and MDI)

Into 100 g of the polyesterpolyol derivative of Example 1 was dissolved 8.5 g of 3,3'-dichloro-4,4'-diaminodiphenylmethane [Cureamine MT, a product of Ihara Chemical Co., Ltd.]. A polymer was prepared in the same manner as in Example 4 with use of 108.5 g of the above solution heated to 50° C. and a molten MDI (25.1 g) heated to 50° C. In the above, the mixture was stirred for 20 seconds, degassed for 1 minute and immediately poured into a mold. Tack free time of the reactants was 4 minutes. The product was taken out from the mold after 30 minutes and further post-cured at 110° C. for 16 hours to obtain an elastomer sheet which was semi-transparent and high in strength. Table 3 gives the properties thereof.

COMPARISON EXAMPLE 3

In order to compare with the polymer of Example 6, a polymer was prepared with use of a corresponding polyesterpolyol. Into 100 g of the mixed polyols of Comparison Example 1 was dissolved 8.5 g of 3,3'-dichloro-4,4'-diaminodiphenylmethane and the solution was heated to 50° C. The reaction was conducted in the same manner as in Example 3 with use of 108.5 g of the solution and a molten MDI (25.1 g) heated to 50° C. The reaction, however, proceeds very fast and the reaction liquid turned white and very viscous at 1 minute and 10 seconds later in the defoaming process, whereby the liquid could not be cast. The reaction liquid could be cast under a mixing time of 15 seconds and a defoaming time of 45 minutes. Nevertheless, the reaction liquid turned white after 1 minute and 10 seconds and tack free time was 2 minutes and 15 seconds. It was difficult to demold the product after 30 minutes since the product was brittle despite of fast solidifying velocity and the product could be demolded after 1.5 hours. The product was further post-cured at 110° C. for 16 hours to obtain a hard elastomer having white and cloudy color.

The product exhibited a variation in hardness due to a crystallization. The hardness reached to 96 (JIS A) after 7 days but lowered to 77 when heated at 60° C. for 20 minutes. The variation of hardness was not found in the product of Example 6. The product of Comparison Example 3 was checked for properties after removing the crystal. The results were given in Table 3.

TABLE 3

| Temp | Item | Ex. 6 | Com. Ex. 3 |
|---|---|---|---|
| 23° C. | Hardness (JIS A) | 86 | 77 |
| | 100% Tension (kg/cm$^2$) | 59 | 28 |
| | 300% Tension (kg/cm$^2$) | 182 | 54 |
| | Tensile strength (kg/cm$^2$) | 553 | 127 |
| | Elongation (%) | 420 | 610 |
| | Tear strength (kg/cm) | 93 | 71 |
| 120° C. | Tensile strength (kg/cm$^2$) | 80 | (Note 2) |

(Note 2) impossible to measure due to destruction of sample when placed in an air pressure type clamp

EXAMPLE 7

(Polyaddition product of polyesterpolyol derivative, chain extender and TDI)

Into 100 g of the polyesterpolyol derivative of Example 1 was dissolved 17.0 g of 3,3'-dichloro-4,4'-diaminodiphenylmethane. A polymer was prepared in the same manner as in Example 6 with use of 117.0 g of the above solution heated to 50° C. and TDI (23.3 g) heated to 25° C. Tack free time in the reactants was 9 minutes. The product was taken out from the mold after 30 minutes and further post-cured at 110° C. for 16 hours to obtain an elastomer sheet which was transparent and high in strength. Table 4 gives properties thereof.

COMPARISON EXAMPLE 4

In order to compare with the polymer of Example 7, a polymer was prepared with use of a corresponding polyesterpolyol. Into 100 g of the mixed polyols of Comparison Example 1 was dissolved 17.0 g of 3,3'-dichloro-4,4'-diaminodiphenylmethane and the solution was heated to 50° C. The reaction was conducted in the same manner as in Example 6 with use of 117.0 g of the solution and 2,4-TDI (23.3 g) heated to 25° C. The reaction, however, proceeds extremely fast and the reaction liquid turned white at about 40 seconds later in the defoaming process, whereby the liquid could not be casted. The reaction liquid could be cast under a mixing time of 15 seconds and without defoaming. Nevertheless, the reaction liquid turned white after 40 seconds and then solidified. It was difficult to demold the product after 40 minutes since the product was brittle despite of fast solidifying velocity and the product was furtther continued to cure. After about 2 hours, the product cracked and then was demolded. The crack was considered to occur by a lack of gel strength against contraction when curing. The product was further post-cured at 110° C. for 16 hours to obtain a hard elastomer sheet having white and cloudy color.

The product exhitibed a variation in hardness due to a crystallization. The hardness reached to 97 (JIS A) after 7 days but lowered to 82 when heated at 60° C. for 20 minutes. The variation hardness was not found in the product of Example 7. The product of Comparison Example 4 was checked for properties after removing the crystal. The results were given in Table 4.

TABLE 4

| Temp | Item | Ex. 7 | Com. Ex. 4 |
|---|---|---|---|
| 23° C. | Hardness (JIS A) | 93 | 82 |
| | 100% Tension (kg/cm²) | 128 | — |
| | 300% Tension (kg/cm²) | 455 | — |
| | Tensile strength (kg/cm²) | 607 | 37 |
| | Elongation (%) | 360 | 50 |
| | Tear strength (kg/cm) | 124 | 38 |
| 120° C. | Tensile strength (kg/cm²) | 114 | (Note 3) |

(Note 3)
impossible to measure due to destruction of sample when placed in an air pressure type clamp

EXAMPLE 8

(Polyaddition product of polyesterpolyol derivative, chain extender and MDI)

Into 100 g of the polyesterpolyol derivative of Example 1 were dissolved 5.8 g of 1,4-butanediol (first-class reagent), 0.3 g of distilled water and 0.3 of triethylenediamine (TEDA, a product of Toyo Soda Manufacturing Co., Ltd.) and the solution was heated to 47° C. To the solution was added a molten MDI (36.2 g) heated to 50° C. The mixture was vigorously stirred for 10 seconds and immediately poured into an iron mold having a thickness of 4 mm, equipped with a cover and heated at 60° C. to obtain a foam. Tack free time of the foam surface was about 40 seconds. The product was demolded after 10 minutes to prepare a soft foam sheet having a density of 0.60. The properties thereof were measured after 7 days. Table 5 shows the results.

COMPARISON EXAMPLE 5

In order to compare with the polymer of Example 8, a foam was prepared in the same manner as in Example 8 except that the mixed polyols of Comparison Example 1 were used in place of the polyesterpolyol derivative of Example 8. Tack free time of the foam was 1 minute and 20 seconds. Since the reaction was slightly slow, it required 20 minutes for demolding. Then, a soft foam sheet was obtained having a density of 0.60.

The product exhibited a variation in hardness due to crystallization. The hardness was 46 (JIS A) after 7 days but lowered to 36 when heated at 60° C. for 20 minutes. The variation of hardness was not seen in the foam of Example 8. The product of Comparison Example 5 was checked for properties after removing the crystal. The results were given in Table 5.

TABLE 5

| Temp | Item | Ex. 8 | Com. Ex. 5 |
|---|---|---|---|
| 23° C. | Density (g/cm³) | 0.60 | 0.60 |
| | Hardness (JIS A) | 41 | 36 |
| | 100% Tension (kg/cm²) | 13 | 12 |
| | Tensile strength (kg/cm²) | 94 | 80 |
| | Elongation (%) | 430 | 450 |
| | Tear strength (B type) (kg/cm) | 29 | 24 |

What is claimed is:
1. A polyesterpolyol derivative of the formula

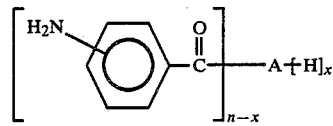

wherein
A is an n-valent radical obtained by removal of terminal hydrogen atoms from an n-valaent polyesterpolyol having a molecular weight of 400 to 10,000 and containing

group in the main chain,
n is an integer of 2 to 4,
x is an average value and a number of 0 to (n−1),
—NH— group of

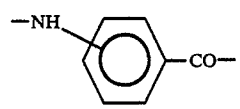

in the main chain forms an amido group connected with a carbonyl group of an aminobenzoic acid and/or a carbonyl group of a polybasic acid component of the polyesterpolyol and,
—CO— group of

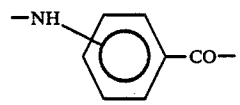

in the main chain forms an ester group or amido group,

2. A process for preparing the polyesterpolyol derivative of claim 1 which comprises reacting one mole of an n-valent polyesterpolyol having a molecular weight of 400 to 10,000 with 0.25 n to 10 n moles of aminobenzoic acid alkyl ester.

3. A polymer which comprises a poly(urethane)ureamide obtained by a reaction of a polyisocyanate and the polyesterpolyol derivative of claim 1.

4. A polymer as defined in claim 3 which is obtained by further reacting a chain extender having a molecular weight of up to 400, in the reaction of the polyesterpolyol derivative and the polyisocyanate.

5. A polymer as defined in claim 3 which is obtained by further reacting a long-chain polyol, long-chain polyamine and/or long-chain aminopolyol, each having a molecular weight more than 400, in the reaction of the polyesterpolyol derivative and the polyisocyanate.

6. A process for preparing the polymer of claim 3 which comprises reacting one mole of an n-valent polyesterpolyol having a molecular weight of 400 to 10,000 with 0.25 n to 10 n moles of aminobenzoic acid alkyl ester, and reacting the polyesterpolyol derivative with a polyisocyanate.

7. A process as defined in claim 6, wherein the reaction of the polyesterpolyol derivative and the polyisocyanate is conducted in the presence of a chain extender having a molecular weight of up to 400.

8. A process as defined in claim 6, wherein the reaction of the polyesterpolyol derivative and the polyisocyanate involves the further reaction of a long-chain polyol, a long-chain polyamine and/or a long-chain aminopolyol, each having a molecular weight of more than 400.

* * * * *